US011060591B2

(12) United States Patent
De Maziere et al.

(10) Patent No.: US 11,060,591 B2
(45) Date of Patent: Jul. 13, 2021

(54) PLANETARY VARIATOR FOR VARIABLE TRANSMISSION

(71) Applicant: MAZARO NV, Destelbergen (BE)

(72) Inventors: Filip De Maziere, Destelbergen (BE); Lucas Present, Rijmenam (BE)

(73) Assignee: MAZARO NV, Destelbergen (BE)

( * ) Notice: Subject to any disclaimer, the term of this patent is extended or adjusted under 35 U.S.C. 154(b) by 388 days.

(21) Appl. No.: 16/090,591

(22) PCT Filed: Apr. 4, 2016

(86) PCT No.: PCT/EP2016/057323
§ 371 (c)(1),
(2) Date: Oct. 2, 2018

(87) PCT Pub. No.: WO2017/174106
PCT Pub. Date: Oct. 12, 2017

(65) Prior Publication Data
US 2020/0408284 A1     Dec. 31, 2020

(51) Int. Cl.
*F16H 15/50* (2006.01)
*F16H 15/32* (2006.01)
*F16H 15/38* (2006.01)

(52) U.S. Cl.
CPC ........... *F16H 15/503* (2013.01); *F16H 15/32* (2013.01); *F16H 15/38* (2013.01)

(58) Field of Classification Search
None
See application file for complete search history.

(56) References Cited

U.S. PATENT DOCUMENTS 2,734,389 A    2/1956   Strecker
4,987,789 A    1/1991   Rohs et al.
(Continued)

FOREIGN PATENT DOCUMENTS

CN     104776180 A    7/2015
DE     19607812 A1    9/1996
(Continued)

OTHER PUBLICATIONS

Qingtao Li et al: "A Mathematical Method for Eliminating Spin Losses in Toroidal Traction Drives", Mathematical Problems in Engineering, vol. 43, No. 9, Jan. 1, 2015 (Jan. 1, 2015), pp. 769-10, XP055324065.

*Primary Examiner* — Colby M Hansen
(74) *Attorney, Agent, or Firm* — Leydig, Voit & Mayer, Ltd.

(57) ABSTRACT

A planetary variator applicable in a variable transmission for realizing a variable speed and torque ratio includes: a ring wheel; at least two planet wheels, the at least two planet wheels including a shaft portion and a wheel portion that is rotatable about the shaft portion, the shaft portion having a longitudinal central axis, the longitudinal central axis also being the rotation axis of the wheel portion, each planet wheel being freely rotatable about a hinge axis that is oriented essentially perpendicularly with respect to a plane defined by the common central axis and the rotation axis of the wheel portion of the planet wheel; and a sun wheel. The ring wheel and the sun wheel are axisymmetric bodies positioned with respect to a common central symmetry axis. Interaction between the ring wheel, the at least two planet wheels, and the sun wheel takes place through a rolling motion.

14 Claims, 4 Drawing Sheets

(56) References Cited

U.S. PATENT DOCUMENTS

| | | | |
|---|---|---|---|
| 5,916,057 A | 6/1999 | Waltz et al. | |
| 2001/0046922 A1* | 11/2001 | Kamamura | F16H 15/38 476/73 |
| 2002/0037787 A1* | 3/2002 | Imanishi | F16H 15/38 476/40 |
| 2002/0111247 A1* | 8/2002 | Mori | F16H 15/38 476/46 |
| 2002/0151407 A1* | 10/2002 | Yoshikawa | F16C 19/10 476/46 |
| 2002/0155919 A1* | 10/2002 | Nanbu | F16H 15/38 476/72 |
| 2006/0019796 A1 | 1/2006 | Brooks | |

FOREIGN PATENT DOCUMENTS

| | | |
|---|---|---|
| EP | 0323824 A1 | 7/1989 |
| FR | 1007407 A | 5/1952 |
| WO | WO 2007040523 A1 | 4/2007 |
| WO | WO 2009146748 A1 | 12/2009 |

* cited by examiner

US 11,060,591 B2

PLANETARY VARIATOR FOR VARIABLE TRANSMISSION

CROSS-REFERENCE TO PRIOR APPLICATIONS

This application is a U.S. National Phase application under 35 U.S.C. § 371 of International Application No. PCT/EP2016/057323, filed on Apr. 4, 2016. The International Application was published in English on Oct. 12, 2017 as WO 2017/174106 under PCT Article 21(2).

FIELD

This invention relates to variable transmissions for driving road vehicles, off-road vehicles, agricultural machinery, driving auxiliaries in vehicles as well as industrial components such as generators and compressors in stationary or mobile equipment.

BACKGROUND

Document WO2009/146748A1 describes several variable transmission systems, based on a drill-free Planetary Variator. This variator comprises traction wheels which transmit power by rolling over each other and which are pressed together with sufficient force to transfer the required torque. The rolling surfaces are designed so as to obtain a so-called drill-free rolling motion, i.e. a rolling without sliding of the rolling surfaces in the contact area.

The Planetary Variator of WO2009/146748A1 is shown in FIG. 1. The system as such functions as a subsystem of a more complex variable transmission. The variator comprises a main shaft 1, a ring wheel 2, a set of planet wheels 3 and a sun wheel 4. Only one planet wheel 3 is shown in the drawing. The ring wheel, the main shaft and the sun wheel are mounted coaxially, i.e. with respect to a common central axis 5. The ring wheel and the sun wheel are pressed together for example by a hydraulic force. The mechanical component, comprised in the planet wheel and realizing the geometric link with the main shaft, is called the planet fork 7, which is connected to the main shaft via a hinge 8. The hinge axis 9 intersects with the axis 5 of the main shaft and is perpendicular thereto. The rolling surfaces of the ring wheel and the sun wheel are designed so that the drill-free rolling motion is ensured regardless of the pivotal position of the planet wheels. In the embodiment of FIG. 1 this is achieved by realizing the rolling surfaces on the basis of the tractrix curve. By changing the angular position of the planet wheels relative to the ring wheel and sun wheel axis, the transmission ratio is changed. This may be achieved by moving the main shaft axially with respect to the ring wheel and the sun wheel, while allowing also an axial movement of the ring wheel and/or the sun wheel. The distance L indicated in FIG. 1 is constant in the variator of FIG. 1. It is the distance between 2 points: one point is the contact point between the planet wheel and the ring wheel or sun wheel; the other point is the intersection between the main axis 5 and the hinge axis 9.

Because the hinge axis 9 intersects the common central axis 5 and because there is a plurality of planet forks, all with their hinge axis intersecting the common central axis 5 through the same point, the construction of the planet forks must be made so as to avoid interference with each other at all inclination angles of the planet wheels. In addition, while changing the ratio to extreme values, either the ring wheel 2 or the sun wheel 4 approaches the planet fork. Contact between the planet fork and the ring wheel or sun wheel, rotating at different speeds, must be avoided. While more stringent requirements in terms of avoiding contact between these components could be met by a lighter fork design, the size of the forks must be large enough to withstand the forces acting on it.

It is clear therefore that the forks in the system of FIG. 1 need to comply with a plurality of conflicting requirements. The design of the forks is therefore a complex matter.

SUMMARY

In an embodiment, the present invention provides a planetary variator applicable in a variable transmission for realizing a variable speed and torque ratio, the variator comprising: a ring wheel; at least two planet wheels, the at least two planet wheels comprising a shaft portion and a wheel portion that is rotatable about the shaft portion, the shaft portion having a longitudinal central axis, the longitudinal central axis also comprising the rotation axis of the wheel portion, each planet wheel being freely rotatable about a hinge axis that is oriented essentially perpendicularly with respect to a plane defined by the common central axis and the rotation axis of the wheel portion of the planet wheel; and a sun wheel, wherein the ring wheel and the sun wheel are axisymmetric bodies positioned with respect to a common central symmetry axis, wherein interaction between the ring wheel, the at least two planet wheels, and the sun wheel takes place through a rolling motion of a rolling surface provided on each of the planet wheels' wheel portions, on rolling surfaces provided on the ring wheel and the sun wheel, wherein two planes that are tangential to the rolling surfaces of the ring wheel and the sun wheel, in tangential contact points with a respective planet wheel of the at least two planet wheels, intersect with the rotation axis of the wheel portion of the respective planet wheel in a point of the common central axis, irrespective of an angular position of the respective planet wheel about the hinge axis, and wherein the hinge axis of each of the at least two planet wheels is external to the common central axis.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
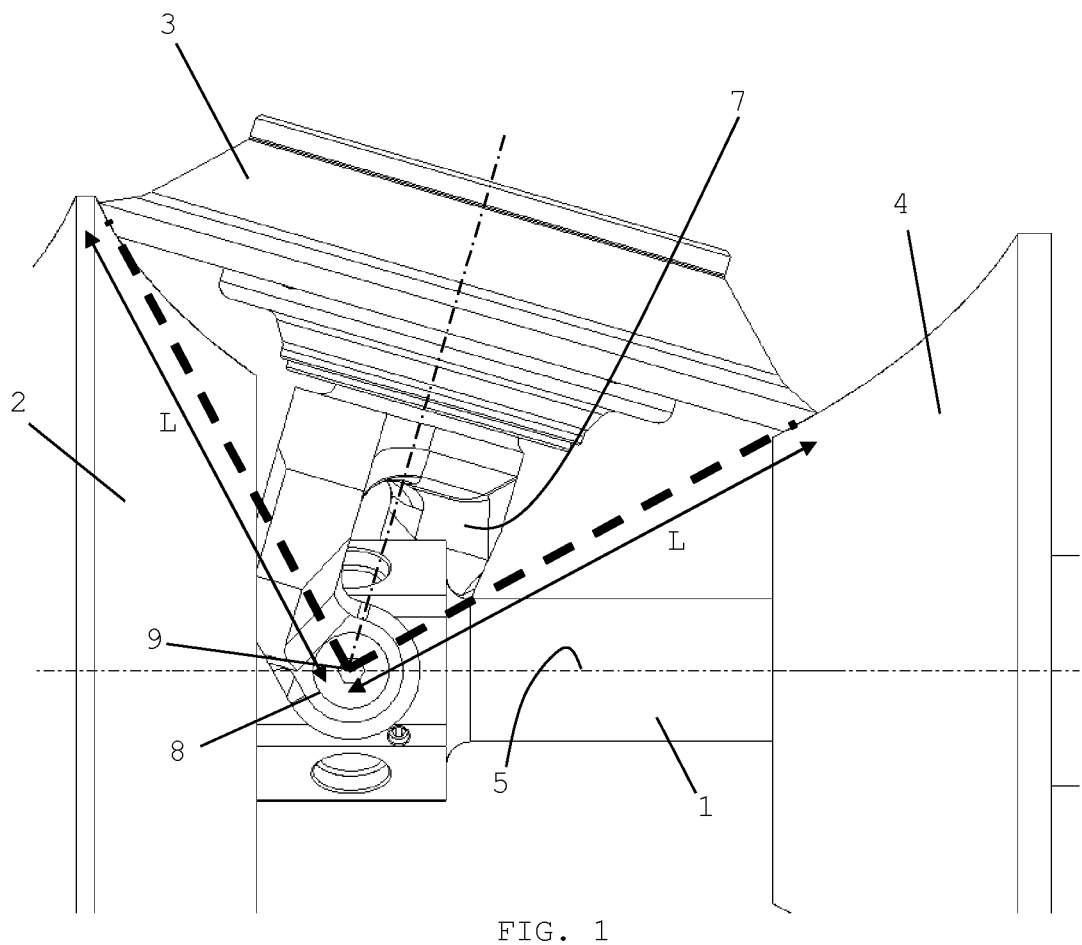
FIG. 1 illustrates the Planetary Variator as disclosed in WO2009/146748A1.

The invention is related to a planetary variator as described in the appended claims. The invention is thus related to a planetary variator applicable in a variable transmission for realizing a variable speed and torque ratio, the variator comprising a ring wheel, at least two planet wheels and a sun wheel, wherein:

the ring wheel and the sun wheel are axisymmetric bodies positioned with respect to a common central symmetry axis, the planet wheels comprise a shaft portion and a wheel portion that is rotatable about the shaft portion, the shaft portion having a longitudinal central axis, said axis being also the rotation axis of the wheel portion, each planet wheel is freely rotatable about a hinge axis that is oriented essentially perpendicularly with respect to the plane defined by the common central axis and the rotation axis of the wheel portion of the planet wheel, the interaction between the wheels takes place through a rolling motion of a rolling surface provided on each of the planet wheels' wheel portions, on rolling surfaces provided on the ring wheel and the sun wheel, wherein the two planes which are tangential to the rolling surfaces of the ring wheel and the sun wheel, in the tangential contact points with a planet wheel, intersect with the rotation axis of the wheel portion of said planet wheel in a point of the common central axis, regardless of the angular position of said planet wheel about the hinge axis, and wherein the hinge axis of each of the planet wheels is external to the common central axis.

The condition of the tangent planes intersecting with the wheel portion's rotation axis in a point of the central axis, regardless of the angular position of the planet wheel defines the shape of the rolling surfaces of the ring wheel and the planet wheel. This shape is non-circular. Therefore a change of the angular position of the planet wheels corresponds to a change in the relative distance between the ring wheel and the sun wheel in the direction of the central axis. This is accommodated by the ring wheel and the sun wheel being configured to be moveable in said direction, relatively one with respect to the other. In operation, the sun wheel and the ring wheel are pressed together in the axial direction, i.e. in the direction of the central axis. Means for pressing together the sun and ring wheel, such as a mechanical slope, or a hydraulic or pneumatic piston, or any other suitable means for this purpose known as such in the art, may be part of the planetary variator or of a transmission into which the variator is integrated.

According to an embodiment, the hinge axis intersects with (i.e. has a point in common with) the rotation axis of the planet wheel.

According to a further embodiment, the hinge axis is located between the wheel portion of the planet wheel and the intersection point between the planet wheel rotation axis and the central axis.

In the latter case, the variator may comprise a central shaft provided with a radial extension, wherein the shaft portion of the planet wheels is rotatably connected to the radial extension through a hinge joint. The shaft portion of the planet wheels may be provided with a fork being rotatable about the hinge joint, with respect to the radial extension.

According to an embodiment, the fork has a main body, a central leg portion and two side leg portions, the three leg portions extending away from the main body and being connected to the hinge joint.

According to a further embodiment, the hinge axis is located beyond the wheel portion of the planet wheel, as seen from the intersection point between the planet wheel rotation axis and the central axis.

In the latter case, the variator may comprise a support wheel mounted coaxially with the ring wheel and the sun wheel, wherein the shaft portion of the planet wheel is rotatably connected to the support wheel through a hinge joint. The hinge joint may be incorporated in the support wheel.

According to a further embodiment, the rolling surface of the wheel portion of at least one of the planet wheels has the shape of a circle, as seen in a cross section with a plane through the rotation axis of said wheel portion. Alternatively, the rolling surface of the wheel portion of at least one of the planet wheels may have a non-circular shape, as seen in a cross section with a plane through the rotation axis of said wheel portion.

According to an embodiment, the wheel portion of at least one of the planet wheels rotates about the shaft portion via one or more bearings, said bearing or bearings having an inner ring and an outer ring, and wherein the wheel portion is mounted directly onto the outer ring of at least one of the bearings.

According to a further embodiment, the wheel portion of the planet wheel rotates about the shaft portion via one or more bearings, said bearing or bearings having an inner ring and an outer ring, and wherein the wheel portion forms a single piece with the outer ring of at least one of the bearings.

The invention is equally related to a variable or reversible variable transmission comprising one or more planetary variators according to the invention.

The invention is related to a planetary variator having similar components as the variator of WO2009/146748, but wherein the hinge axis is not intersecting the central axis. The inventors have found that it is nevertheless possible to design the rolling surfaces of the ring wheel and the sun wheel in such a way that the essentially drill-free rolling motion takes place. The eccentric position of the hinge overcomes the above-named limitations, as will be explained on the basis of a number of preferred embodiments.

Figure 2:
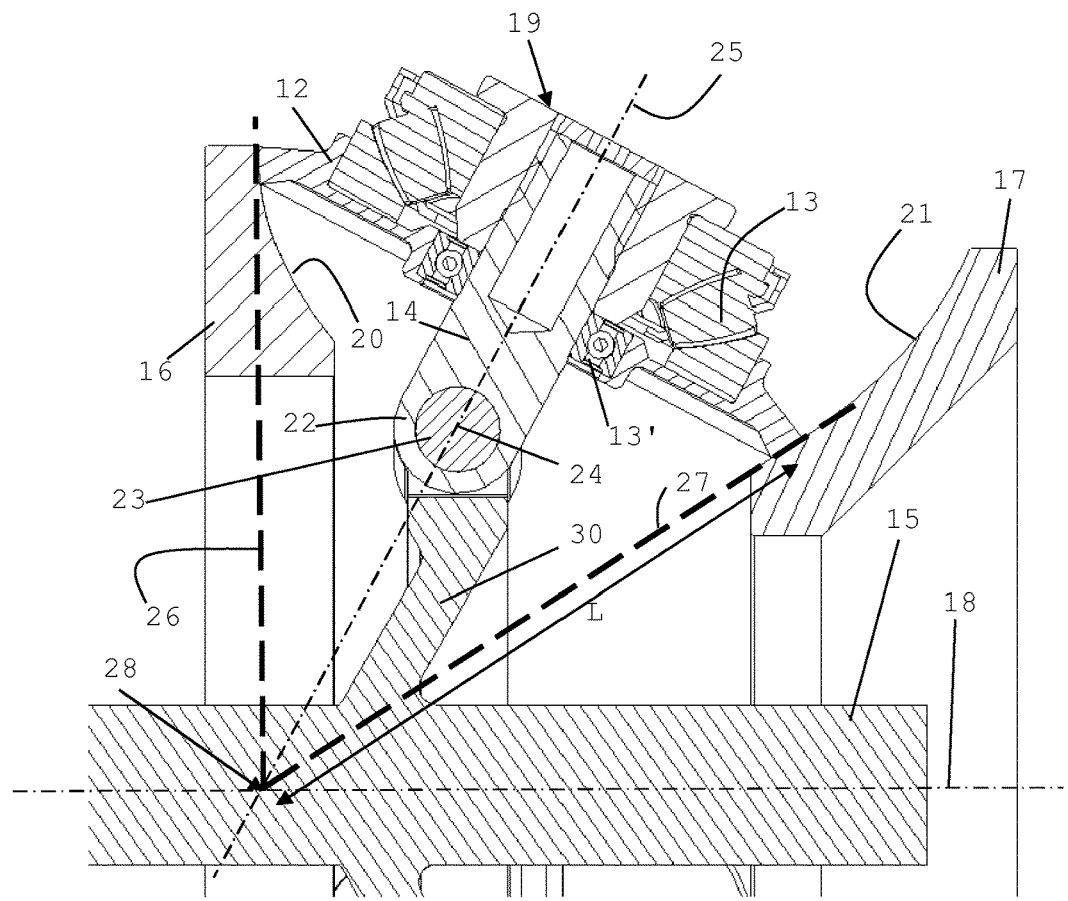
FIG. 2 illustrates a planetary variator according to a first embodiment of the invention.

FIG. 2 shows a first embodiment of a planetary variator according to the invention. As in the prior art design, the variator comprises a main shaft 15, a ring wheel 16 and a sun wheel 17, the ring and sun wheels being axisymmetric bodies coaxially arranged about a common central axis 18, and a set of planet wheels 19 configured to roll essentially drill-free over the rolling surfaces 20 and 21 of the ring wheel and the sun wheel. By a suitable means, such as a mechanical slope, or a hydraulic or pneumatic piston, the ring wheel 16 and the sun wheel 17 are pressed against each other. Each planet wheel 19 is provided with a shaft portion 14 and a wheel portion 12 that rotates about the shaft portion 14 via a thrust bearing 13 and a radial bearing 13'. The shaft portion's longitudinal axis 25 is also the rotation axis of the wheel portion 12 of the planet wheel 19. The planet wheel shaft portion 14 ends in a fork 22 which is pivotable about a hinge joint 23, so that the planet wheel as a whole is freely rotatable about the hinge axis 24. Contrary to the prior art system, the hinge axis 24 is external to the common central axis 18. In other words, the hinge axis 24 does not intersect the common central axis 18, i.e. it is placed eccentrically to the central axis 18. In the embodiment of FIG. 2, this is achieved by mounting the fork 22 on the rim of a radial extension 30 that is fixed to and preferably forms a single body with the main shaft 15. The hinge axis 24 is oriented perpendicularly with respect to the plane defined by the intersecting planet wheel's rotation axis 25 and the central axis 18. Nevertheless, the designer may apply small deviations from this perpendicular orientation in order to compensate for small deformations of the components when the planetary variator is subjected to loads during operation. In other words, the perpendicular orientation is obtained at least when the variator is in operation.

Figure 3:
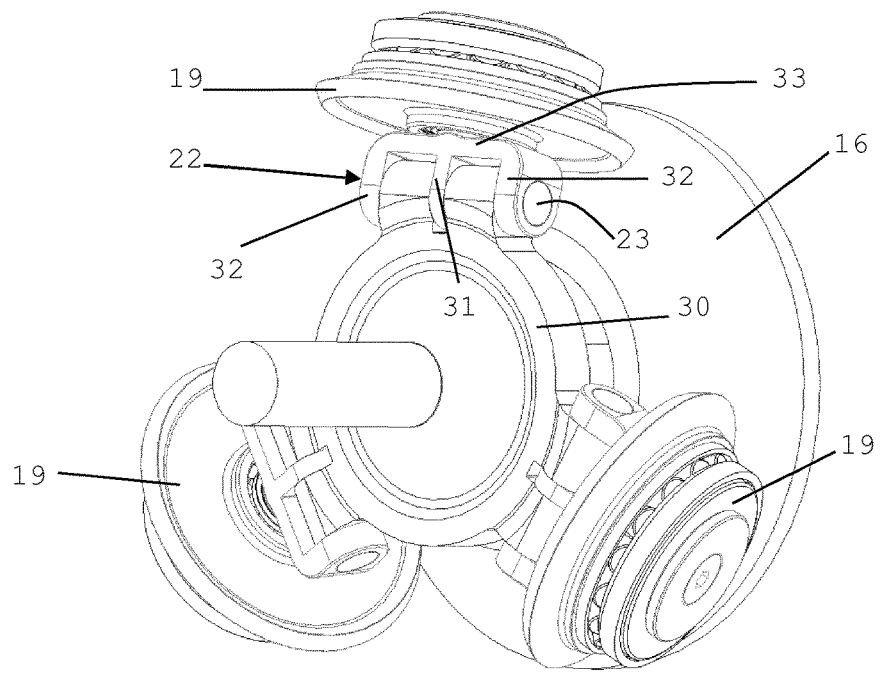
FIG. 3 is a 3-D view of an embodiment similar to the one shown in FIG. 2.

FIG. 3 shows a 3-D view of this embodiment, illustrating three planet wheels 19 and the ring wheel 16 and leaving out the sun wheel in order to allow a view of the planet wheels 19. In this embodiment, the radial extension is a circular extension 30 circumventing the main shaft 15. As seen in FIG. 3, the forks 22 for the different planet wheels 19 are now located at different points around the circumference of the main shaft 15. This makes the construction and design of the forks 22 easier as they no longer need to be placed close together as in the prior art design. Because of the simplified construction of the forks, these elements can be optimized in terms of the required size and mechanical characteristics to withstand the load, while at the same time allowing an increased range of the inclination angles that can be covered, which translates into an increased range of the attainable torque and speed ratio. For example, as in the embodiment shown in FIG. 3, the forks can be produced with a main body 33 and three leg portions extending away from the main body and connected to the hinge joint 23: a central leg portion 31 and two side leg portions 32. This construction is different from the fork in the prior art design of FIG. 1 which is equipped with only two leg portions, mainly because of the limited space into which multiple forks need to be incorporated. The three-leg construction shown in FIG. 3 increases the capability of withstanding the important pulling force along the axis of the planet wheel 19 as well as withstanding the tilting moments resulting from the traction forces in the rolling contacts.

In the embodiment of FIG. 2, the lines 26 and 27 are the tangents to the rolling surfaces 20 and 21 on the ring wheel 16 and the sun wheel 17 respectively, in the points of contact with the planet wheel 19. As seen in the drawing, these tangents and the rotation axis 25 of the planet wheel intersect in a point 28 of the common central axis 18, which is the condition for obtaining the essentially drill-free rolling motion. More generally, the tangent planes 26/27 to the rolling surfaces 20/21 in the two tangential contact points of the planet wheel with these rolling surfaces 20/21, intersect with the planet wheel rotation axis 25 in a point 28 of the central axis 18, regardless of the angular position of the planet wheel 19 about the hinge axis 24. With 'tangential contact points' is meant: points where the rolling surface of planet wheel's wheel portion 12 is tangential to the rolling surfaces of the ring wheel 16 and the sun wheel 17. Again, small deviations from this condition of intersecting in a point 28 of the central axis 18 may be applied to compensate for component deformation under load, i.e. the condition of intersecting in point 28 is achieved at least during operation of the variator.

Contrary to the prior art system, the distance L between the intersection point 28 and the contact points on the two rolling surfaces 20/21 is no longer a constant in the planetary variator according to the invention. Despite this, it is possible to calculate the shape of the rolling surfaces 20 and 21 for drill free rolling motion, as will be demonstrated hereafter.

Figure 4:
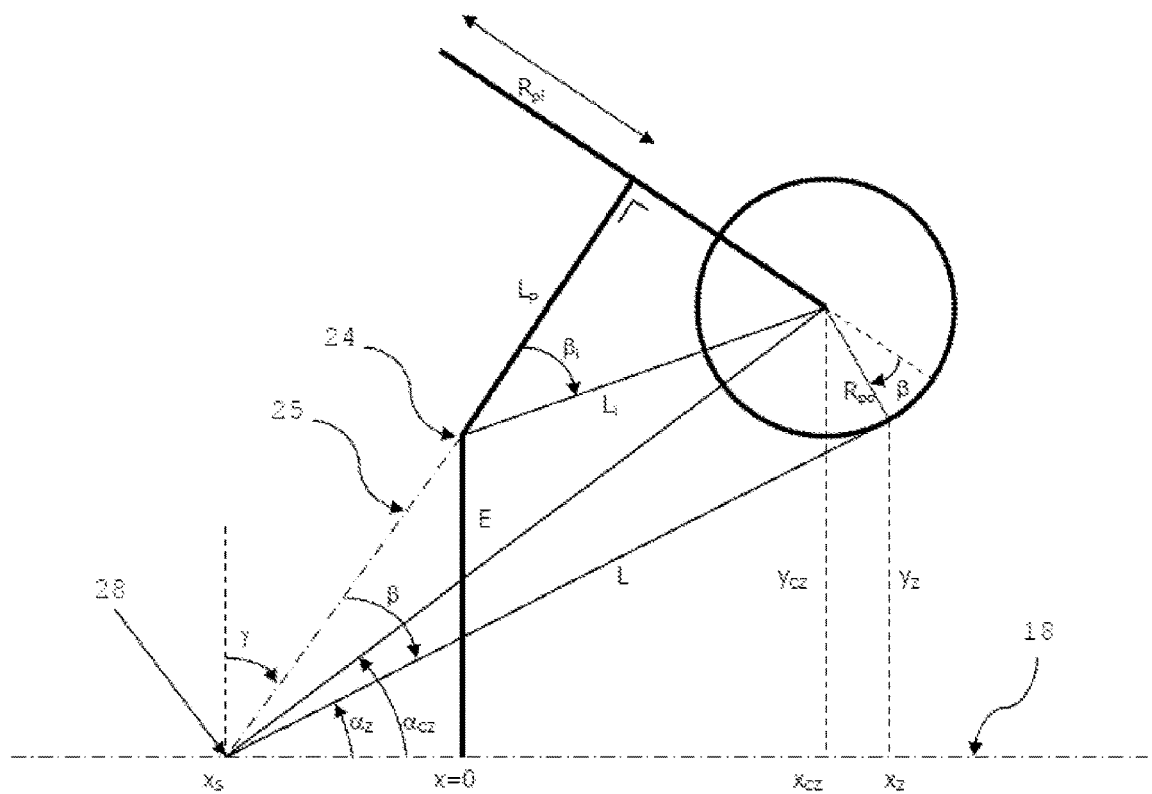
FIGS. 4 and 5 illustrate the geometrical parameters used for calculating the shape of the rolling surfaces of the ring wheel and the sun wheel according to a preferred embodiment of the invention.

FIG. 4 shows a geometrical image of the components of the embodiment of FIG. 2, showing a number of dimensions required in the calculation. The starting point is the assumption that the cross section of the planet wheel's rolling surface, as seen in the plane of the drawing in FIG. 2, has the shape of a circle with a radius $R_{po}$. The planet wheel is thus modelled in FIG. 4 as a disc with radius $R_{pi}$, provided with a torus-shaped surface of radius $R_{po}$, circumventing the disc, and further provided with a central connection of length $L_p$ (modelling the planet wheel shaft 14) to the hinge axis 24. Further in the description we will point out that alternative surface shapes of the planet wheel's rolling surface are possible instead of the circular surface, but for the purpose of the presently presented calculation, we start from a circular cross section of the planet wheel's rolling surface.

Further parameters required in the calculation are the following:

E is the eccentricity of the hinge, i.e. the distance between the hinge axis 24 and the common central axis 18,
L is the variable length as explained above,
γ is the inclination of the planet wheel's rotation axis 25, which is taken as the parameter to control the ratio.

FIG. 4 further indicates the angles and distances required for calculating the shape of the curve 21 of the sun wheel's rolling surface as seen in the cross-section with the plane of the drawing. The various parameters are defined in an orthogonal X-Y plane with X=0 defined by the position of the hinge axis 24.

The set of equations which defines the shape of the sun wheel's rolling surface 21 by expressing the requirement that the tangent of length L intersects the central axis in the same point 28 as the planet wheel's rotation axis 25, is the following:

$$y_Z = L \sin(\alpha_Z) \quad (1)$$

$$dy_Z/dx = +\tan(\alpha_Z) \quad (2)$$

These equations can be written as a function of the variable γ by applying the following relationships which can be derived from the geometry shown in FIG. 4:

$$L_i = \sqrt{(R_{pi}^2 + L_p^2)}$$

$$\beta_i = \arctan(R_{pi}/L_p)$$

$$x_S = -E \tan \gamma$$

$$x_{CZ} = L_i \sin(\gamma + \beta_i)$$

$$y_{CZ} = E + L_i \cos(\gamma + \beta_i)$$

$$\alpha_{CZ} = \arctan(y_{CZ}/(x_{cz} - x_s))$$

$$L = \sqrt{(y_{CZ}^2 + (x_S - x_{CZ})^2 - R_{po}^2)}$$

$$\alpha_Z = \alpha_{CZ} - \arctan(R_{po}/L)$$

with Lp, E, Rpi and Rpo constant values.

Introducing these relationships into the equations (1) and (2) allows to solve the system of equations. Preferably this is done by a numerical method, by calculating the coordinates of the points of the curve for consecutive steps in γ, resulting in steps $\Delta y_z$ of the y-coordinate $y_z$:

$$x_{Z(i+1)} = x_{Zi} + \Delta y_Z / \tan(\alpha_Z)$$

$$y_{Z(i+1)} = y_{Zi} + \Delta y_Z$$

As known to the person skilled in the art, suitable software is available for solving the equations in the above-indicated way. The inventors have found that the curve shape 21 as shown in FIG. 2 which results from this calculation, effectively allows an essentially drill-free rolling motion of the planet wheel over the sun wheel.

Figure 5:
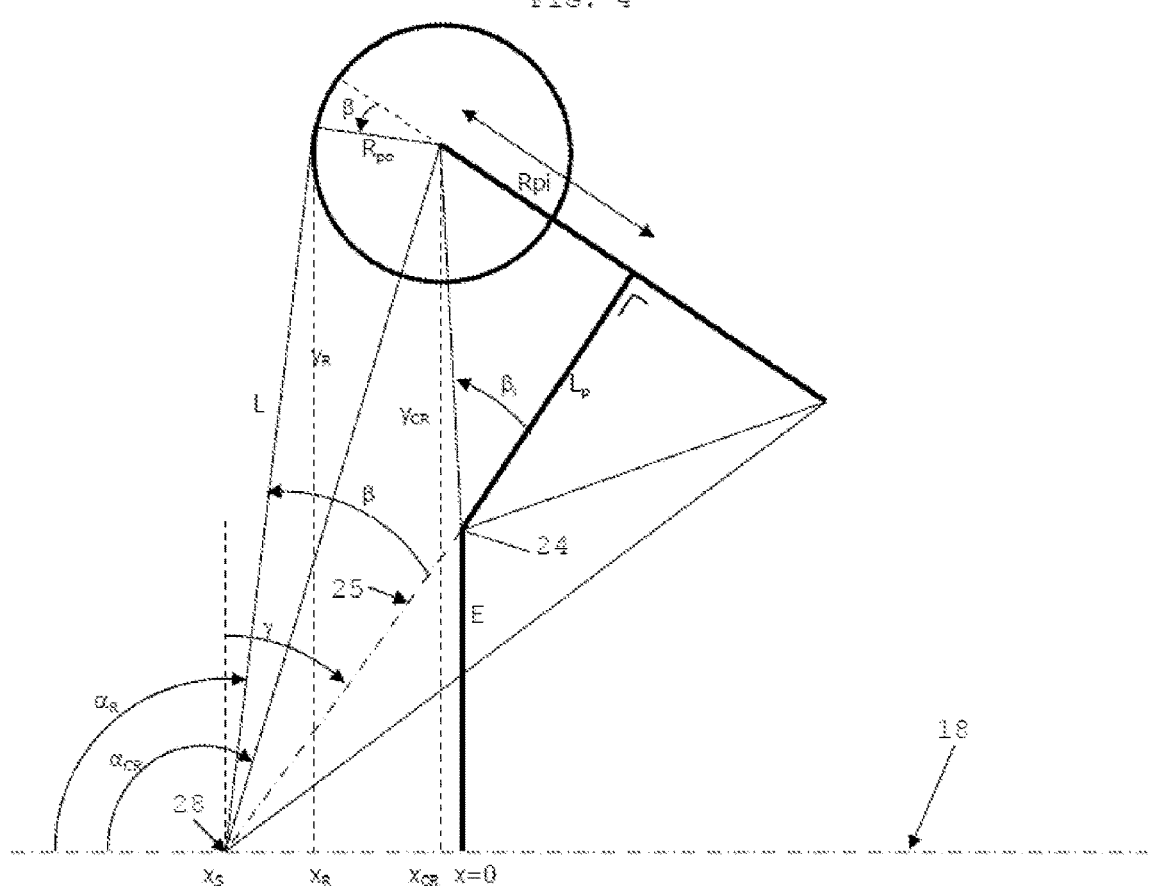

FIG. 5 illustrates the angles and dimensions required for the calculation of the ring wheel's rolling surface 20.

The equations to be solved here are the following:

$$y_R = L \sin(\alpha_R) \quad (3)$$

$$dy_R/dx = -\tan(\alpha_R) \quad (4)$$

wherein $$x_{CR} = L_i \sin(\gamma - \beta_i)$$

$$y_{CR} = E + L_i \cos(\gamma - \beta_i)$$

$$L = \sqrt{(y_{CR}^2 + (x_S - x_{CR})^2 - R_{po}^2)}$$

$$\alpha_{CR} = \arctan(y_{CR}/(x_S - x_{CR}))$$

$$\alpha_R = \alpha_{CR} - \arctan(R_{po}/L)$$

Numerically solving the equations (3) and (4) is done in the following way, analogous to equations (1) and (2):

$$x_{R(i+1)} = x_{Ri} - \Delta y_R / \tan(\alpha_R)$$

$$y_{R(i+1)} = y_{Ri} + \Delta y_R$$

yielding the curve 20 as shown in FIG. 2.

Since the angle β changes together with γ, the position of the contact point on the planet wheel moves when the ratio changes. This characteristic allows the designer to make the radius $R_{po}$ dependent from β. In other words, the cross section of the planet wheel rolling surface does not need to be a circle necessarily; another curve can be chosen too, for example an ellipse. The same formulas remain valid; only $R_{po}$ varies with γ. The angle β equals 90°−γ−$\alpha_Z$. So the surface of the planet wheel is defined by recalculating $R_{po}$ as a function of β because FIGS. 4 and 5 show that β and $R_{po}$ define the rolling surface as polar coordinates.

The tilting movement of the planet wheels 19 about the hinge axis 24, i.e. the changing of the inclination angle γ of the planet wheels 19, causes a change in the transmission ratio. This is because the tilting changes the distance between the common central axis 18 and the contact points of the planet wheel 19 on the ring wheel 16 and the sun wheel 17. Because the running surfaces 20/21 of the ring and sun wheels have no circular cross section, the distance between the ring wheel 16 and the sun wheel 17 varies while the ratio is changing. This means that in operation, a relative axial movement, i.e. in the direction of the central axis 18, of the ring wheel 16 and the sun wheel 17 is possible. This can be achieved by mounting both wheels 16/17 to be moveable, or keeping one wheel fixed and allowing movement of the other. The tilting action can be actuated in a number of ways, for example by moving the central shaft 15 axially with respect to the ring wheel or the sun wheel. Alternatively, the transmission ratio can be changed by keeping the main shaft 15 axially fixed and by moving the ring wheel 16 and/or the sun wheel 17 axially.

In the embodiment of FIG. 2, the parameter $L_p$, i.e. the length of the planet wheel's shaft portion 14, is a positive value. However, if $L_p$ is negative or zero, this means that the angle $\beta_i = \arctan(R_{pi}/L_p)$ becomes respectively negative or 90°. In this case, it still makes sense to solve the equations and determine the rolling surfaces of the ring wheel and the sun wheel. The case $L_p < 0$ corresponds with the embodiment shown in FIG. 6.

Figure 6:
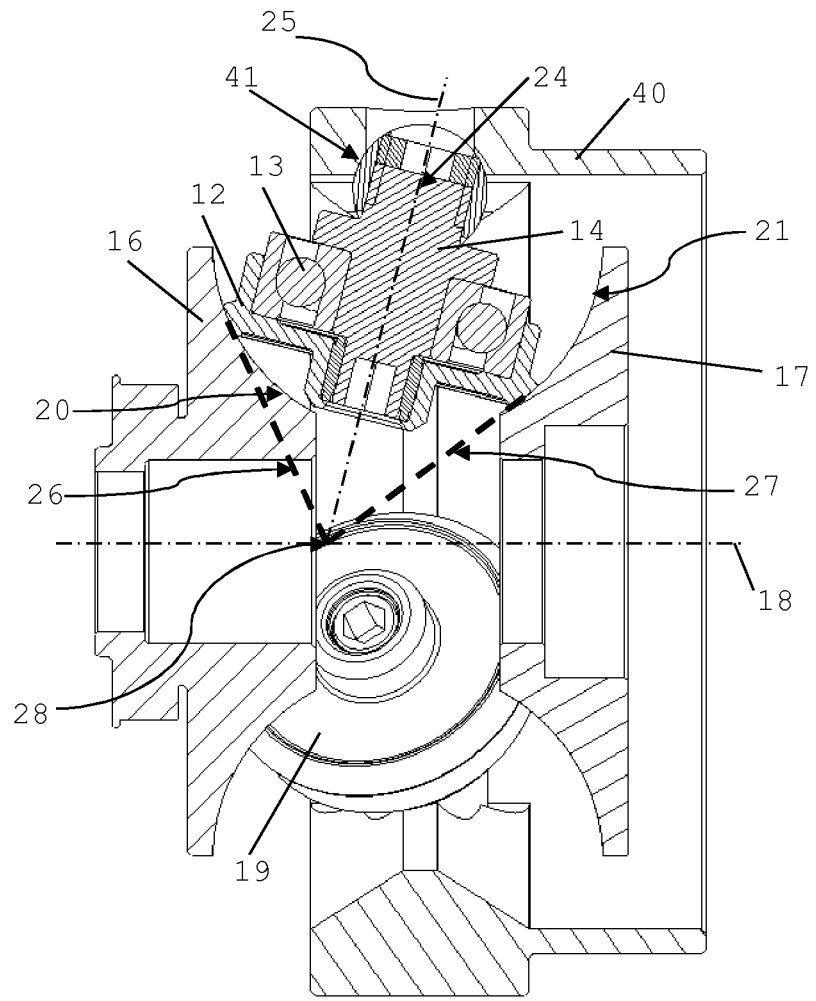
FIG. 6 illustrates a planetary variator according to a second embodiment.

In FIG. 6, the following components are again present, and referenced by the same reference numerals as in FIG. 2: the ring wheel 16, the sun wheel 17, the planet wheels 19, the common central axis 18, the rolling surfaces 20 and 21 of the ring wheel and the sun wheel respectively, the planet wheel shaft 14, the wheel portion 12 of the planet wheel, the planet wheel's roller bearings 13, the tangents 26/27 intersecting the central axis 18 and the rotational axis 25 of the planet wheel 19 in a point 28.

In the embodiment of FIG. 6 however, the hinge axis 24 is located beyond the wheel portion 12 of the planet wheel, as seen from the intersection point 28 of the planet wheel rotation axis 25 with the central axis 18, whereas in the embodiment of FIG. 2, the hinge axis 24 lies between the intersection point 28 and the wheel portion 12. In the particular system shown in FIG. 6, the planet wheels 19 are pivotably mounted in a support wheel 40, which is itself mounted coaxially with the ring wheel 16 and the sun wheel 17. This effectively comes down to the situation of FIG. 2 but with the planet wheel's shaft 14 extending on the opposite side of the wheel portion 12. The shaft 14 of the planet wheel is now pivotably mounted with respect to the support wheel 40, so as to be able to pivot about hinge axis 24 which is oriented, as in FIG. 2, perpendicularly with respect to the plane defined by the planet wheel's rotation axis 25 and the central axis 18, while being external to the central axis. As shown in the embodiment of FIG. 6, the planet wheel's shaft 14 is preferably mounted directly into a hinge joint 41 incorporated in the support wheel 40. In this embodiment there is no central shaft and no forks in the central portion of the variator. Therefore no physical constraints exist in this central portion which could limit the angular range of the planet wheels.

As in the embodiment of FIG. 2, tilting of the planet wheels 19 effectuates a change in the transmission ratio, involving a relative axial movement of the ring wheel and the sun wheel. The support wheel 40 can be axially movable with respect to the ring wheel or the sun wheel, or it can be maintained fixed with the ring and sun wheel being axially movable. The support wheel 40 may be rotatable about the central axis 18. In that case, the support wheel 40 is mounted on bearings, placed outside of the planetary variator. Instead of a support wheel 40, any alternative support can be used for supporting the planet wheels in the manner shown in FIG. 6.

The case Lp=0 is equally included in the scope of the invention and corresponds to an embodiment wherein the shaft portion 14 of the planet wheel hinges about an axis that is coplanar with the contact points between the planet wheel and the rolling surfaces 20/21.

In the embodiments of FIGS. 2 and 6, the hinge axis 24 intersects with the rotation axis 25 of the wheel portion 12 of the planet wheel 19. However the invention is not limited to these embodiments. Whilst remaining essentially perpendicular to the plane formed by the rotation axis 25 and the central axis 18, the hinge axis 24 may cross the rotation axis 25 without intersecting, i.e. without having a point in common. The structures shown in FIG. 2 or 6 may thus be modified in that the hinge axis 24 may for example be shifted left or right or up or down with respect to the planet wheel's rotation axis 25. When the hinge axis 24 is not intersecting the rotation axis 25, it remains possible to calculate the shape of the rolling surfaces 20/21 of the ring wheel and the sun wheel on the basis of the condition for essentially drill-free rolling, i.e. the two planes 26/27 which are tangential to the rolling surfaces 20/21, in the tangential contact points with a planet wheel 19, intersect with the rotation axis 25 of the wheel portion 12 of said planet wheel 19 in a point 28 of the common central axis 18, regardless of the angular position of said planet wheel 19 about the hinge axis 24.

When the hinge axis 24 is not intersecting the planet wheel's rotation axis 25, said hinge axis is defined as lying 'between the wheel portion 12 of the planet wheel 19 and the intersection point 28 of the planet wheel rotation axis 25 and the central axis 18', when the common perpendicular line between the hinge axis 24 and the planet wheel's rotation axis 25 intersects the planet wheel's rotation axis 25 in a point between the wheel portion 12 of the planet wheel 19 and the intersection point 28 of the planet wheel rotation axis 25 and the central axis 18. Furthermore, when the hinge axis 24 is not intersecting the planet wheel's rotation axis 25, the hinge axis is defined as lying beyond the wheel portion 12 of the planet wheel, as seen from the intersection point 28 between the planet wheel rotation axis 25 and the central axis 18, when the common perpendicular line between the hinge axis 24 and the planet wheel rotation axis 25 intersects the planet wheel's rotation axis 25 in a point located beyond the wheel portion 12 of the planet wheel, as seen from the intersection point 28 between the planet wheel rotation axis 25 and the central axis 18.

The planet wheels 19 shown in FIGS. 2 and 6 have a constructional feature that is different from the planet wheels applied in presently known systems of this type. With reference to FIG. 2, it is seen that the wheel portion 12 of the planet wheel 19 is mounted directly on the outer rings of the thrust bearing 13 and the radial bearing 13'. Likewise in FIG. 6, the planet wheel portion 12 is mounted directly on the outer ring of the roller bearing 13. This feature of directly mounting the wheel portion on the bearings allows a simplified planet wheel design. It is however applicable only when the planet wheel size can be reduced in comparison with existing designs. Because the variator with eccentric hinges according to the invention needs less space between the ring wheel and the sun wheel, the planet wheel portion can be made relatively small in diameter. For this reason, the planet wheel design with the wheel portion mounted directly on the bearing ring is particularly suitable for a variator according to the invention. According to particular embodiments, the wheel portion 12 of the planet wheel and the outer ring of the bearing or bearings 13 or 13' is produced as a single piece. Other embodiments are possible wherein the wheel portion 12 is mounted directly on the outer ring of one bearing while forming one piece with the outer ring of a second bearing.

Any configuration known for the system of WO2009/146748 can be realized also with the variator of the present invention. The invention is therefore equally related to a variable transmission or to a reversible variable transmission comprising one or more planetary variators according to the invention. Any such transmission may be realized by integrating the planetary variator of the invention in the variable or reversible variable transmissions described in WO2009/146748.

While the invention has been illustrated and described in detail in the drawings and foregoing description, such illustration and description are to be considered illustrative or exemplary and not restrictive. Other variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS

Prior art variator (FIG. 1)
1: main shaft
2: ring wheel
3: planet wheel
4: sun wheel
5: central axis
7: planet fork
8: hinge
9: hinge axis
Variator according to the invention (FIG. 2-6)
12: wheel portion of planet wheel
13: bearing
13': radial bearing
14: shaft portion of planet wheel
15: main shaft
16: ring wheel
17: sun wheel
18: central axis
19: planet wheel
20: rolling surface on ring wheel
21: rolling surface on sun wheel
22: fork
23: hinge joint
24: hinge axis
25: rotation axis of wheel portion of planet wheel, also referred to at some instances in this description as 'planet wheel's rotation axis'
26: tangent to rolling surface of ring wheel in contact point with planet wheel
27: tangent to rolling surface of sun wheel in contact point with sun wheel
28: intersection point of tangents with central axis
30: radial extension
31: central leg of fork
32: side legs of fork
40: support wheel
41: hinge joint in support wheel

The invention claimed is:

1. A planetary variator applicable in a variable transmission for realizing a variable speed and torque ratio, the variator comprising:
   a ring wheel;
   at least two planet wheels, the at least two planet wheels comprising a shaft portion and a wheel portion that is rotatable about the shaft portion, the shaft portion having a longitudinal central axis, the longitudinal central axis also comprising the rotation axis of the wheel portion, each planet wheel being freely rotatable about a hinge axis that is oriented essentially perpendicularly with respect to a plane defined by the common central axis and the rotation axis of the wheel portion of the planet wheel; and
   a sun wheel,
   wherein the ring wheel and the sun wheel are axisymmetric bodies positioned with respect to a common central symmetry axis,
   wherein interaction between the ring wheel, the at least two planet wheels, and the sun wheel takes place through a rolling motion of a rolling surface provided on each of the planet wheels' wheel portions, on rolling surfaces provided on the ring wheel and the sun wheel,
   wherein two planes that are tangential to the rolling surfaces of the ring wheel and the sun wheel, in tangential contact points with a respective planet wheel of the at least two planet wheels, intersect with the rotation axis of the wheel portion of the respective planet wheel in a point of the common central axis, irrespective of an angular position of the respective planet wheel about the hinge axis,
   wherein the hinge axis of each of the at least two planet wheels is eccentric to the common central axis with constant eccentricity,
   wherein a distance between the wheel portion and the hinge axis is constant, and
   wherein the planetary variator is configured to actuate a change of the angular position of the planet wheels and therewith a change of a transmission ratio by a relative axial motion between the hinge axis and the ring wheel and/or a relative axial motion between the hinge axis and the sun wheel.

2. The planetary variator according to claim 1, wherein the hinge axis intersects with the rotation axis of the planet wheel.

3. The planetary variator according to claim 1, wherein the hinge axis is located between the wheel portion of the planet wheel and an intersection point of the planet wheel rotation axis and the central axis.

4. The planetary variator according to claim 3, further comprising a central shaft having a radial extension,
   wherein the shaft portion of the at least two planet wheels is rotatably connected to the radial extension through a hinge joint.

5. The planetary variator according to claim 4, wherein the shaft portion of the at least two planet wheels includes a fork that is rotatable about the hinge joint, with respect to the radial extension.

6. The planetary variator according to claim 5, wherein the fork has a main body, a central leg portion, and two side leg portions, the three leg portions extending away from the main body and being connected to the hinge joint.

7. The planetary variator according to claim 1, wherein the hinge axis is located beyond the wheel portion of the planet wheel, as seen from an intersection point between the planet wheel rotation axis and the central axis.

8. The planetary variator according to claim 7, further comprising a support wheel mounted coaxially with the ring wheel and the sun wheel,
   wherein the shaft portion of the planet wheel is rotatably connected to the support wheel through a hinge joint.

9. The planetary variator according to claim 8, wherein the hinge joint is incorporated in the support wheel.

10. The planetary variator according to claim 1, wherein the rolling surface of the wheel portion of at least one of the planet wheels has the shape of a circle, as seen in a cross section with a plane through the rotation axis of the wheel portion.

11. The planetary variator according to claim 1, wherein the rolling surface of the wheel portion of at least one of the planet wheels has a non-circular shape, as seen in a cross section with a plane through the rotation axis of the wheel portion.

12. The planetary variator according to claim 1, wherein the wheel portion of at least one of the planet wheels is configured to rotate about the shaft portion via at least one bearing, the at least one bearing having an inner ring and an outer ring, and
   wherein the wheel portion is mounted directly onto the outer ring.

13. The planetary variator according to claim 1, wherein the wheel portion of the planet wheel is configured to rotate about the shaft portion via at least one bearing, the at least one bearing having an inner ring and an outer ring, and
   wherein the wheel portion forms a single piece with the outer ring.

14. A variable or reversible variable transmission, comprising:
   one or more of the planetary variator according to claim 1.

* * * * *